(12) United States Patent
Bennett et al.

(10) Patent No.: US 11,840,157 B2
(45) Date of Patent: Dec. 12, 2023

(54) CHARGE TIME ESTIMATION

(71) Applicant: Rivian IP Holdings, LLC, Plymouth, MI (US)

(72) Inventors: Tyler Jennings Bennett, Long Beach, CA (US); Michael Moore, Chenoa, IL (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 17/379,223

(22) Filed: Jul. 19, 2021

(65) Prior Publication Data

US 2023/0029389 A1 Jan. 26, 2023

(51) Int. Cl.
*B60L 58/12* (2019.01)
*B60K 35/00* (2006.01)
*H02J 7/00* (2006.01)

(52) U.S. Cl.
CPC ........... *B60L 58/12* (2019.02); *B60K 35/00* (2013.01); *B60K 2370/152* (2019.05); *B60K 2370/169* (2019.05); *B60L 2240/62* (2013.01); *H02J 7/0048* (2020.01)

(58) Field of Classification Search
CPC ..... B60L 58/12; B60L 2240/62; B60K 35/00; B60K 2370/152; B60K 2370/169; H02J 7/0048
See application file for complete search history.

(56) References Cited

U.S. PATENT DOCUMENTS

| | | | | |
|---|---|---|---|---|
| 10,421,420 | B2 * | 9/2019 | Skaff | B60L 58/12 |
| 2003/0006914 | A1 * | 1/2003 | Todoriki | B60W 50/0097 |
| | | | | 701/423 |
| 2010/0138098 | A1 * | 6/2010 | Takahara | B60L 15/2045 |
| | | | | 701/31.4 |
| 2011/0202221 | A1 * | 8/2011 | Sobue | B60L 8/003 |
| | | | | 701/22 |
| 2012/0116606 | A1 * | 5/2012 | Ichinokawa | B60L 3/12 |
| | | | | 701/1 |
| 2012/0179311 | A1 * | 7/2012 | Skaff | H02J 7/0048 |
| | | | | 180/65.21 |
| 2012/0262104 | A1 * | 10/2012 | Kirsch | B60L 53/66 |
| | | | | 320/101 |

(Continued)

FOREIGN PATENT DOCUMENTS

| | | | | | |
|---|---|---|---|---|---|
| GB | 2116728 | A | * | 9/1983 | G01R 31/3613 |
| GB | 2568465 | A | * | 5/2019 | B60L 3/12 |

(Continued)

*Primary Examiner* — Chico A Foxx
(74) *Attorney, Agent, or Firm* — Haley Guiliano LLP

(57) ABSTRACT

Systems and methods are provided for estimating charge time for an electric vehicle. A current vehicle range of the electric vehicle may be determined, and a range selection of the electric vehicle may be determined. Based on the current vehicle range and a charging range associated with the range selection, an intermediate charging range between the current vehicle range and the charging range associated with the range selection is determined. An estimated charge time to charge the electric vehicle to the intermediate charging range may be determined, and an indication of the intermediate charging range and the estimated charge time to reach the intermediate charging range may be generated for presentation.

20 Claims, 8 Drawing Sheets

(56) References Cited

U.S. PATENT DOCUMENTS

| | | | |
|---|---|---|---|
| 2013/0221928 A1* | 8/2013 | Kelty | B60L 58/24 |
| | | | 320/134 |
| 2014/0172282 A1 | 6/2014 | Feng et al. | |
| 2017/0326983 A1* | 11/2017 | You | H02J 7/0048 |
| 2019/0092177 A1* | 3/2019 | Malik | G06Q 10/06 |
| 2019/0107406 A1 | 4/2019 | Cox et al. | |
| 2019/0143832 A1* | 5/2019 | Birek | B60L 53/68 |
| | | | 701/22 |
| 2019/0217716 A1* | 7/2019 | Yang | H02J 7/0071 |
| 2019/0383637 A1* | 12/2019 | Teske | B60L 53/14 |
| 2020/0130528 A1* | 4/2020 | You | B60L 53/66 |
| 2020/0171970 A1* | 6/2020 | Lee | B60L 7/10 |
| 2021/0399568 A1* | 12/2021 | Huang | H02J 7/0047 |

FOREIGN PATENT DOCUMENTS

| | | | |
|---|---|---|---|
| JP | 2010264791 A | * 11/2010 | |
| WO | WO-2011163623 A1 | * 12/2011 | B60L 11/1838 |

* cited by examiner

CHARGE TIME ESTIMATION

INTRODUCTION

Electric vehicles often provide charging information to a driver regarding a charge level of an electric battery of the vehicle. In one approach, an amount of time that the electric battery needs to be charged to reach a full charge, such as 100% charge, is displayed to the driver. However, many drivers may not currently need a fully charged (or nearly fully charged) battery, and thus it may not be helpful to receive estimates for lengths of time to reach a full level of charge.

SUMMARY

In accordance with the present disclosure, systems and methods are provided to improve the selection and presentation of charging range setpoints and estimated charging times to reach the charging range setpoints, in order to provide more useful information to a driver of an electric vehicle (e.g., while charging the electric vehicle or otherwise). Such presented information enables the driver to ascertain a suitable charging range and estimated charge time required for the electric vehicle to meet the current or predicted needs of the driver without spending an excessive amount of time at a charge station. In some embodiments, based on a driver's history, one or more suggested destinations, along with respective charging ranges to enable the electric vehicle to at least reach the suggested destinations and associated charge times, may be conveniently provided to the driver of the electric vehicle in an easily digestible format.

In accordance with the present disclosure, systems and methods are provided for estimating charge time for an electric vehicle, and may comprise a display and processing circuitry configured to determine a current vehicle range of the electric vehicle, determine a range selection of the electric vehicle, and determine, based on the current vehicle range and a charging range associated with the range selection, an intermediate charging range between the current vehicle range and the range selection. An estimated charge time to charge the electric vehicle to the intermediate charging range may then be determined, and an indication of the intermediate charging range and the estimated charge time to reach the intermediate charging range may be generated for presentation at the display.

In some embodiments, the processing circuitry is configured to determine the range selection based on a vehicle destination or by receiving a user inputted range selection, where the user-inputted range selection may correspond to a usage selection. The usage selection may correspond to of a daily usage selection, an extended usage selection, or a trip usage selection, each of the daily usage selection, the extended usage selection, and the trip usage selection being associated with a respective distance estimation In some embodiments, the indication of the intermediate charging range comprises a distance (e.g., a number of miles or kilometers) the electric vehicle can be driven at the intermediate charging range. In some embodiments, the intermediate charging range is less than 80% of a charge capacity of a battery of the electric vehicle.

In some embodiments, the processing circuitry is configured to determine the intermediate charging range by: monitoring a driving history of the electric vehicle; identifying, based on the driving history, an anticipated navigation location of the electric vehicle; and determining, as the intermediate charging range, a charging range that enables the electric vehicle to reach the anticipated navigation location.

In some embodiments the processing circuitry may be configured to determine the intermediate charging range by referencing a look-up table stored in memory, the look-up table indicating a plurality of intermediate charging range values and corresponding current vehicle range values and corresponding charging range values associated with respective range selections; and determining the intermediate charging range using the look-up table and based on the determined current vehicle range and the charging range associated with the determined range selection.

In some embodiments, the processing circuitry is configured to determine the intermediate charging range by: monitoring a driving history of the electric vehicle; and identifying, based on the driving history, a plurality of anticipated navigation locations of the electric vehicle. A plurality of intermediate charging ranges may be determined, each respective intermediate charging range enabling the electric vehicle to reach a respective location of the plurality of identified anticipated navigation locations, and the processing circuitry is configured to generate for presentation each indication of the intermediate charging range and each estimated charge time to reach the intermediate charging range by generating for presentation a plurality of indications corresponding to the plurality of anticipated navigation locations, respectively, and a plurality of indications of the respective intermediate charging ranges associated with the plurality of anticipated navigation locations.

In some embodiments, the processing circuitry is further configured to: determine that the electric vehicle is being charged at a DC fast electric charging station, and determine the estimated charge time to charge the electric vehicle to the intermediate charging range based on the determination that the electric vehicle is being charged at a DC fast electric charging station.

In some embodiments, the processing circuitry is further configured to generate for presentation a charge level status meter, where a first position of the charge level status meter represents the current vehicle range, and a first peg indicator at a second position of the charge level status meter represents the intermediate charging range.

In some embodiments, the processing circuitry is further configured to generate for presentation, at a third position of the charge level status meter a second peg indicator representing the charging range associated with a charging range determined based on the range selection, where the third position is located further along the charge level status meter than the first position and the second position, and an estimated charge time to reach the charging range associated with the range selection. In response to determining the current vehicle range has reached the intermediate charging range: the systems and methods may modify the generating for presentation of the first peg indicator associated with the intermediate charging range, and continue to generate for presentation the second peg indicator and the estimated charge time to reach the range selection charging range.

In some embodiments, a non-transitory computer-readable medium is provided having non-transitory computer-readable instructions encoded thereon that, when executed by a processor, cause the processor to determine a current vehicle range of the electric vehicle, determine a range selection of the electric vehicle; determine, based on the current vehicle range and the range selection, an intermediate charging range between the current vehicle range and the range selection; determine an estimated charge time to charge the electric vehicle to the intermediate charging range; and generate for presentation an indication of the intermediate charging range and the estimated charge time to reach the intermediate charging range.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

The present disclosure is directed to improved techniques for providing electric charge information to a driver of an electric vehicle, and more particularly to determining, based on a current vehicle range and a range selection of the electric vehicle, an intermediate charging range between the current vehicle range and a charging range associated with the range selection, and generating for presentation at a display an indication of the intermediate charging range and the estimated charge time to reach the intermediate charging range.

Figure 1:
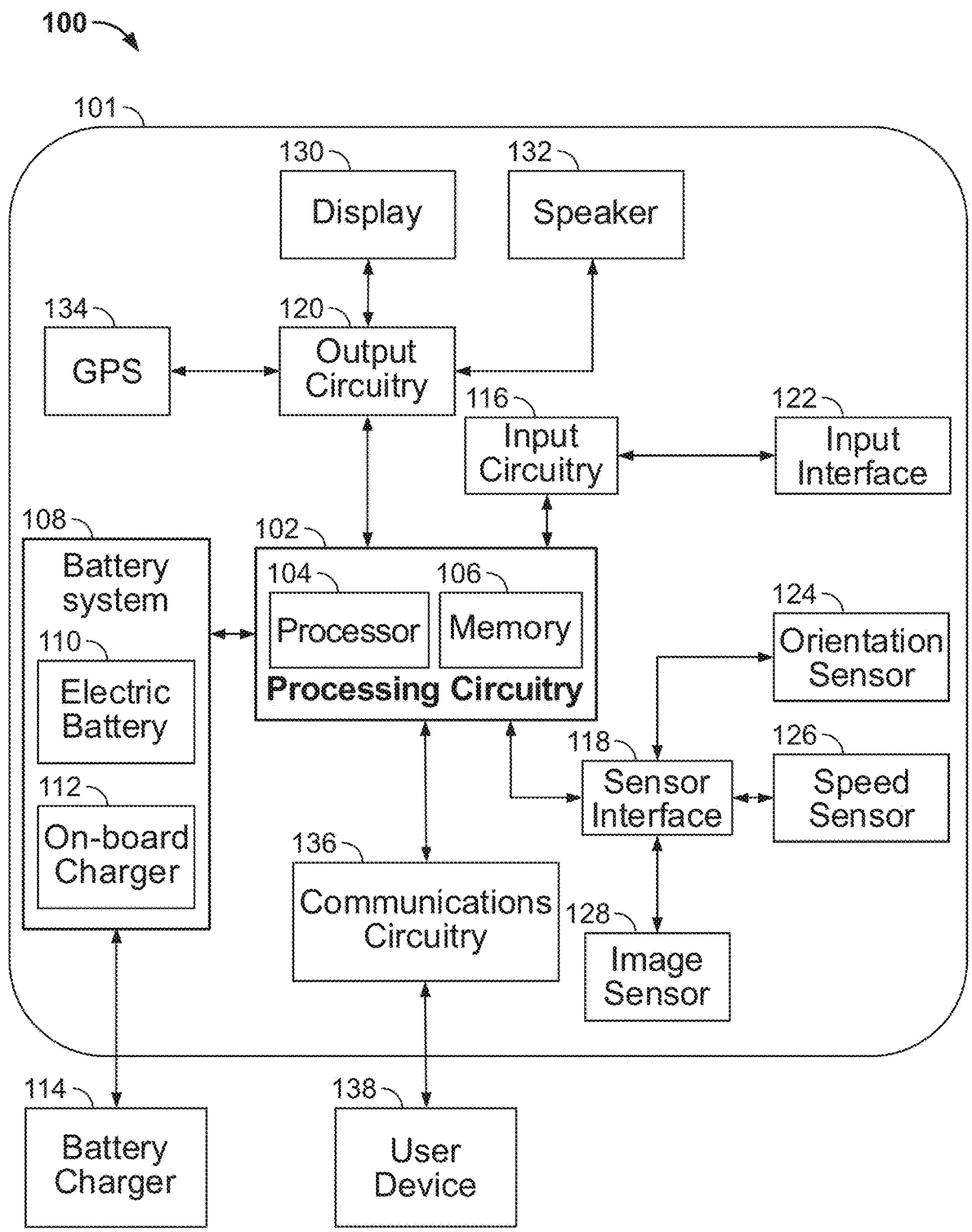
FIG. 1 shows a block diagram of components of a system of an electric vehicle for providing information including an intermediate charging range and an estimated time to reach the intermediate charging range, in accordance with some embodiments of the present disclosure.

FIG. 1 shows a block diagram of components of a system 100 of electric vehicle 101 for providing, to a driver of electric vehicle 101, information including an intermediate charging range and estimated time to reach the intermediate charging range, in accordance with some embodiments of the present disclosure. Vehicle 101 may be a car (e.g., a coupe, a sedan, a truck, an SUV, a bus), a motorcycle, an aircraft (e.g., a drone), a watercraft (e.g., a boat), or any other type of vehicle.

Vehicle 101 may comprise processing circuitry 102 which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection.

Processing circuitry 102 may be communicatively connected to battery system 108, which may be configured to provide power to one or more of the components of vehicle 101 during operation. In some embodiments, vehicle 101 may be an electric vehicle or a hybrid electric vehicle. Battery system 108 may comprise electric battery 110, which may include one or more battery modules. In some embodiments, battery 110 may be a 180 kWh battery pack or a 135 kWh battery pack. Battery system 108 may further comprise on-board charger 112 to manage the flow of electricity to electric battery 110 (e.g., to perform AC-DC conversion when battery charger 114 is an AC charger), and any other suitable components. In some embodiments, on-board charger 112 may include connectors for interfacing with battery charger 114. Battery system 108 may be configured to manage charging of battery 110, which may include measuring one or more characteristics of battery 110, identifying if a fault has occurred, providing power to components of vehicle 101, communicating with battery charger 114, any other suitable actions, or any combination thereof. Battery system 108 may include, for example, electrical components (e.g., switches, bus bars, resistors, capacitors), control circuitry (e.g., for controlling suitable electrical components), and measurement equipment (e.g., to measure voltage, current, impedance, frequency, temperature, or another parameter). Battery system 108 may provide charge status information to processing circuitry 102. Charge status information includes, for example, charge level, whether the battery is being charged, charging current, charging voltage, charging mode, and whether a charging fault exists.

In some embodiments, electric vehicle 101 may be plugged, or otherwise connected to, battery charger 114 via a cable (e.g., having a SAE J1772 charging plug, a CCS connector, etc.), having more than one conductor of suitable gauge. Such cable may include conductors for carrying charging current and conductors for transmitting information. It will be understood that any suitable arrangement of leads may be used in accordance with the present disclosure.

Battery charger 114 may be coupled to a power source, e.g., a power transmission grid, a solar panel, a generator, a wind turbine, or another vehicle, and may be configured to provide charging current at a suitable charging voltage to battery 110 of electric vehicle 101. In some embodiments, battery charger 114 may correspond to a charger at a DC station (e.g., DC fast electric charging station) or AC station. Battery charger 114 may be, for example, a fixed charging station (e.g., a charging station installed in a public location or in a user's home), or a portable charger (e.g., a charger connected to a portable generator, a portable solar panel, or another vehicle). In some embodiments, battery charger 114 may be capable of charging battery 110 at one or more voltages, with one or more current limitations. For example, battery charger 114 may receive information from battery system 108 indicating what voltage, current, or both, electric vehicle 101 may be charged with. Battery charger 114 may provide a charging current that is limited by one or more constraints. For example, electric vehicle 101 may communicate to battery charger 114 what charging current is desired for charging. In a further example, a cable type may have a maximum associated current capacity based on insulation and heat transfer considerations. In some embodiments, battery charger 114 and on-board charger 112 support both the inflow and outflow of current from battery 110 via a coupling. For example, during vehicle to vehicle charging or vehicle to grid power supply, battery charger 110 and/or on-board charger 112 may direct power from battery 110 to a power source coupled to battery charger 114, such as a battery of another vehicle or an electric power grid.

Image sensor 128 (e.g., a camera) may be communicatively coupled to processing circuitry 102 (e.g., by way of sensor interface 118) and positioned at any suitable position in an interior or exterior of vehicle 101. In some embodiments, image sensor 128 may capture images of destinations traveled to by vehicle 101 to identify driving habits of vehicle 101. Processing circuitry 102 may be communicatively connected to input interface 122 (e.g., a steering wheel, a touch screen display, buttons, knobs, a microphone or other audio capture device, etc.) via input circuitry 116. In some embodiments, a driver of vehicle 101 may be permitted to select certain settings in connection with the operation of vehicle 101 (e.g., input a range selection, etc.). In some embodiments, processing circuitry 102 may be communicatively connected to a navigation system, e.g., Global Positioning System (GPS) system 134 of vehicle 101, where the driver may interact with the GPS system via input interface 122. GPS system 134 may be in communication with multiple satellites to ascertain the vehicle's location and provide navigation directions to processing circuitry 102. As another example, the positioning device operate may operate on terrestrial signals, such as cell phone signals, Wi-Fi signals, or ultra-wideband signals to determine a location of electric vehicle 101. The determined location may be in any suitable form such as a geographic coordinate, a street address, a nearby landmark such as an identification of the nearest charging station or a tagged location associated with the vehicle (e.g., a location of a home of the user stored in memory 106). In some embodiments, processing circuitry 102 uses the determined location to identify whether the vehicle is within a threshold range of a tagged location (e.g., is within a certain range from a charging station). In some embodiments, battery system 108 may utilize the determined location to identify whether battery charger 110 is a home charging station or a non-home charging station (e.g., a public charging station, another vehicle, a generator, etc.).

Processing circuitry 102 may be communicatively connected to display 130 and speaker 132 by way of output circuitry 120. Display 130 may be located at a dashboard of vehicle 101 and/or a heads-up display at a windshield of vehicle 101. Additionally or alternatively, the display 130 may be visible on an exterior of the vehicle (e.g., a front fascia, bi-pillar support) and/or at a screen associated with battery charger 114. For example, an interface for GPS system 134 or an interface of an infotainment system may be generated for display, and display 130 may comprise an LCD display, an OLED display, an LED display, or any other type of display. In some embodiments, display 130 may provide a driver with intermediate charging range information and estimated charge time information based on information output by battery system 108. Speaker 132 may be located at any location within the cabin of vehicle 101, e.g., at the dashboard of vehicle 101, on an interior portion of the vehicle door. In some embodiments, speaker 132 may be configured to provide audio alerts related to intermediate charging range information and estimated charge time information based on information output by battery system 108.

Processing circuitry 102 may be communicatively connected (e.g., by way of sensor interface 118) to orientation sensor 124 which may be an inclinometer, an accelerometer, a tiltmeter, any other pitch sensor, or any combination thereof and may be configured to provide vehicle orientation values (e.g., vehicle's pitch and/or vehicle's roll) to processing circuitry 102. Speed sensor 126 may be one of a speedometer, a GPS sensor, or the like, or any combination thereof, and may be configured to provide a reading of the vehicle's current speed to processing circuitry 102.

In some embodiments, processing circuitry 102 may be in communication (e.g., via communications circuitry 136) with user device 138 (e.g., a mobile device, a computer, a key fob, etc.). Such connection may be wired or wireless. In some embodiments, user device 138 may execute instructions stored in memory to run a battery range status application, e.g., to be provided with intermediate charging range information and estimated charge time information on user device 138, based on information output by battery system 108.

It should be appreciated that FIG. 1 only shows some of the components of vehicle 101, and it will be understood that vehicle 101 also includes other elements commonly found in vehicles (e.g., electric vehicles), e.g., a motor, brakes, wheels, wheel controls, turn signals, windows, doors, etc.

Figure 2:
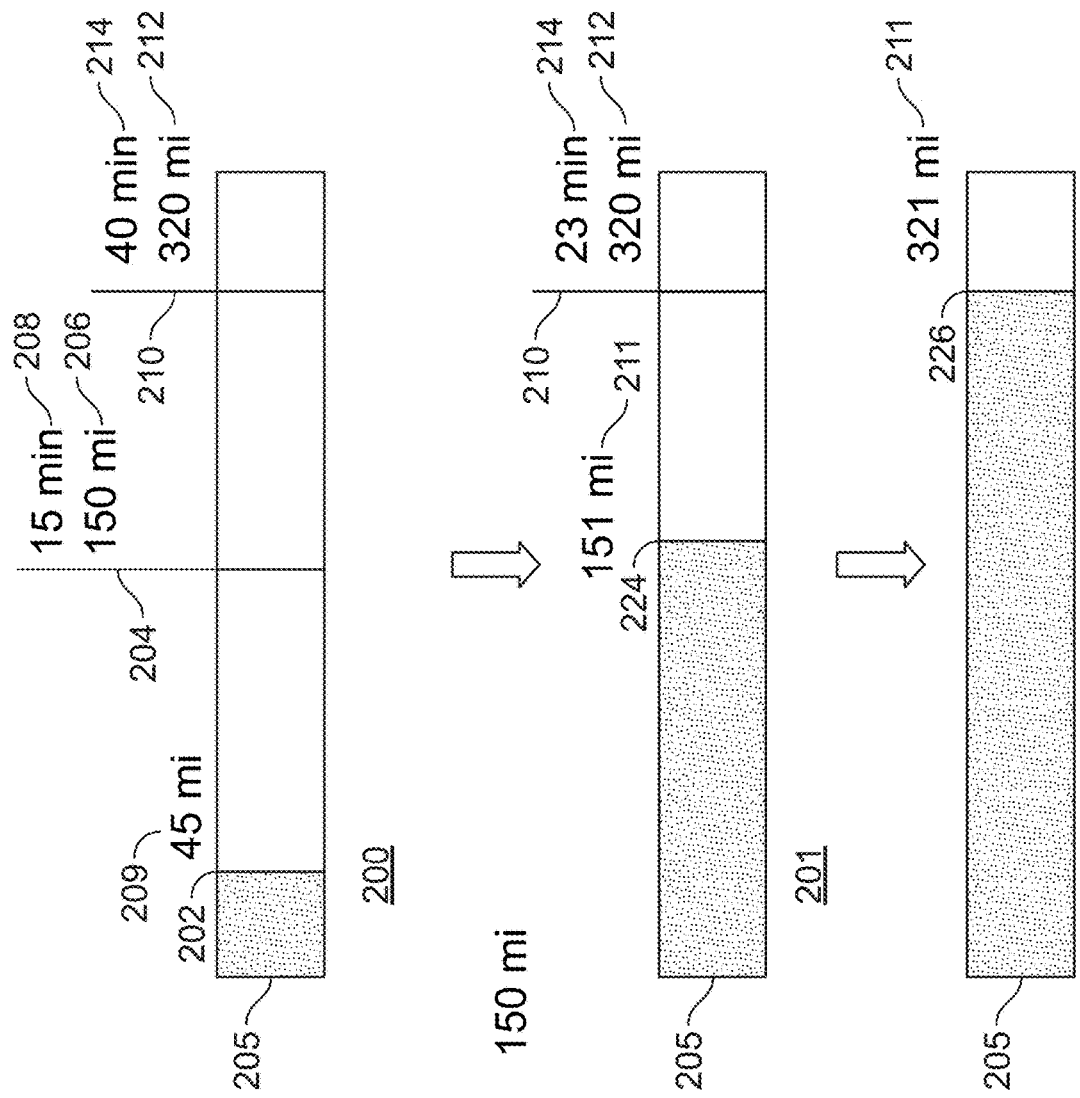
FIG. 2 shows exemplary information, including an intermediate charging range and estimated time to reach the intermediate charging range, displayed to a driver of an electric vehicle over time, in accordance with some embodiments of the present disclosure.

FIG. 2 shows exemplary information, including an intermediate charging range and an estimated time to reach the intermediate charging range, displayed to a driver of an electric vehicle over time, in accordance with some embodiments of the present disclosure. Examples of information displayed at three stages of time are represented, in order of occurrence, as 200, 201, and 203. Charge level status meter 205 may be displayed to a driver of electric vehicle 101 by way of a graphical user interface (GUI) at display 130 and/or a display of user device 138 and/or a display of charger 114 to indicate a level of charge of battery 110. At 200, charge level status meter 205 may be displayed based on battery status information received from battery system 108 (and/or GPS information from GPS 134), e.g., in a scenario that vehicle 101 has arrived at a location at which battery charger 114 is located (e.g., a charging station) with battery 110 of vehicle 101 having a current vehicle range (e.g., 45 miles) corresponding to the indicated charge level 202. In some embodiments, an indication 209 of the current vehicle range may be provided at a first position associated with the indication 202 of the current charge level. In some embodiments, positions along charge level status meter 205 (e.g., in the x or y direction) may represent different state-of-charge (SOC) and/or respective charging ranges associated with the represented SOCs, where movement in a particular direction may represent an increase in SOC and/or range (e.g., when moving from a left-hand side of charge level status meter 205 to a right-hand side of charge level status meter 205). Charge level status meter 205 may be arranged in any suitable manner, e.g., charge level status meter 205 may correspond to any suitable shape (e.g., such as, for example, a dial where indications of different SOCs and/or associated ranges may be depicted at different positions in a clockwise direction along the dial) and may be depicted with any suitable combination of colors (e.g., when the indication 202 of the current charge level approaches indicator 204, a particular color may be utilized for indicator 204 to emphasize its location to the user).

In some embodiments, processing circuitry 102 may receive input by way of input interface 122 from a driver, the input specifying a range selection of electric vehicle 101. For example, a plurality of range selection options may be provided to the driver, each corresponding to a type and/or amount of driving a driver expects to drive electric vehicle 101 during a particular period of time (e.g., the current day). In some embodiments, the range selection may correspond to a vehicle destination (e.g., a destination selected by the driver via GPS 134 and/or user device 138, or a likely destination predicted based on vehicle driving history stored in memory 106 and/or information received from user device 138). In some embodiments, the charging range indicated at 212 and associated with the range selection may be determined based on a standard charging range (e.g., 80% of the capacity of battery 110 of vehicle 101). The standard charging range may correspond to a charging range that is sufficiently close to a fully charged battery but not at a fully charged state of battery 110 (e.g., since it may be take less time, or the same amount of time, to reach 80% capacity of battery 110 starting at a low charge as compared to the time consumed by charging battery 110 from 80% charge to 100% charge).

Charge level status meter 205 may be associated with first peg indicator 204 at a position (e.g., a second position) corresponding to a charge level that enables vehicle 101 to travel an intermediate charging range, indicated at 206 (e.g., indicated in miles or kilometers), and an estimated charge time, indicated at 208, to reach the charge level associated with intermediate charging range indicated at 206. Charge level status meter 205 may further include a second peg indicator 210 at a position (e.g., a third position) corresponding to a charge level that enables vehicle 101 to travel a charging range indicated at 212 that corresponds to the range selection (e.g., input by a user or based on a vehicle destination), and an estimated charge time indicated at 214 to reach such charging range indicated at 212. In computing the estimated charge times 208 and 214, processing circuitry 102 may take into account a type of battery charger 114 (e.g., a DC fast charger). As the charge level indicated at 202 increases during charging, the estimated charge times indicated at 208 and 214, respectively, may be updated continuously to display decreasing estimated times at display 130. The pegs (e.g., first peg indicator 204 and/or second peg indicator 210) may be represented in any suitable manner, e.g., the pegs may comprise a visible presentation feature (e.g., a color, shading or shape of the pegs) that distinguishes the pegs from other charge level indications depicted in charge level status meter 205.

In some embodiments, processing circuitry 102 may determine intermediate charging range indicated at 206 based, at least in part, on driving history of vehicle 101 stored in memory 106. For example, GPS 134 may receive input requesting directions to navigate vehicle 101 to a previously-traveled destination that is over 300 miles away (e.g., a family member's home). Further, processing circuitry 102 may determine that, in the past, the driver of vehicle 101 has taken a detour (e.g., stopped at a hotel) on the way to the same destination, e.g., about 140 miles away from the current location. Such information may be stored in memory 106 and/or user device 138 in association with a user profile of the driver of vehicle 101. In this example, processing circuitry 102 may (e.g., in response to receiving user selection to take the suggested detour, or the system determining to offer the detour as a suggested option) to set the charging range indicated at 212 to 320 miles (e.g., including a 20 mile buffer over the range needed to reach the destination) and may set the intermediate charging range indicated at 206 to 150 miles (e.g., including a 10 mile buffer over the range needed to reach the detour) to account for the anticipated detour. Processing circuitry 102 may cause display of first peg indicator 204 to provide an indication to the driver that a full charge or substantially full charge to the charging range indicated at 212 may not be needed at this time. In some embodiments, processing circuitry 102 may check whether a charging station is located at or near the anticipated detour, to enable vehicle 101 to be further charged at the detour in order to reach the final destination (e.g., the family member's home over 300 miles away, which may be the basis for charging range 212). In some embodiments, the intermediate charging range indicated at 206 may be presented with an indication of the location deemed relevant based on the driving history, and the system may optionally receive input from the driver to modify the location (and thus update the intermediate charging range indicated at 206 based on the modified location). In some embodiments, the aforementioned Tables 1-4 may show standard values and/or be populated with personalized values, or any combination thereof.

In other examples, the intermediate range and Peg indicators may be based on a range selection of the user, which may be determined by the user's selection of a destination or a selection of a general usage range selection, e.g., "Trip," "Extended," "Daily." For example, tables 1-4 shown below illustrate exemplary information which may be stored in memory 106 and may be used by processing circuitry 102 and output circuitry 120 to determine locations of peg indicators 204, 210 and the intermediate charging range indicated at 206. Alternatively or additionally, in determining locations of peg indicators 204, 210, any suitable algorithm may be employed taking as input the current vehicle range and the range selection (and optionally a driving history of vehicle 101). In some embodiments, input circuitry 116 may receive by way of input interface 122 a usage selection associated with a range selection corresponding to one of "Trip", "Extended", and "Daily", based on a projected amount of travel of vehicle 101 over a particular time period. For example, a range selection of "Daily" may be suitable for a user that expects to do a lot of driving around town, whereas a range selection of "Trip" may be suitable for a user that expects to embark on a long journey in vehicle 101, and a selection of "Extended" may fall somewhere in between. Such selections (or other entry of a vehicle destination) may enable processing circuitry 102 to determine that a full charge of battery 110 may not be needed at the current time. In some embodiments, starting range (i.e., current vehicle range) of vehicle 101 may be referenced in the tables based on a number of miles vehicle 101 can travel (Tables 1-2) or state-of-charge (Tables 3-4). In some embodiments, processing circuitry 102 may be configured to perform rounding of the mileage values in the tables below upon displaying such values to the user (e.g., if a trip corresponds to 272 miles, rounding may be performed to a value of 275 miles or 300 miles for display). In some embodiments, processing may be performed based on the percentages in the table below, rather than actual mileage or state-or-charge values. The ways in which Tables 1-4 can be used to determine the locations of peg indicators 208, 210 are explained in further detail below in connection with FIG. 4.

TABLE 1

| 135 kWh Battery pack | | Starting Range | | |
|---|---|---|---|---|
| | x < 100 mi | 100 < x < 150 mi | 150 < x < 200 mi | 200 < x < 250 mi |
| Range Selection | Peg 2 Value | Peg 1 Value | | |
| Trip (300 mi) | 240 mi (80%) | 150 mi (50%) | 200 mi (66%) | n/a | n/a |
| Extended (255 mi) | 240 mi (80%) | 150 mi (50%) | 200 mi (66%) | n/a | n/a |
| Daily (210 mi) | 210 mi (70%) | 150 mi (50%) | 175 mi (58%) | n/a | n/a |

TABLE 2

| 180 kWh Battery pack | | Starting Range | | |
|---|---|---|---|---|
| | x < 100 mi | 100 < x < 150 mi | 150 < x < 200 mi | 200 < x < 250 mi |
| Range Selection | Peg 2 Value | Peg 1 Value | | |
| Trip (400 mi) | 320 mi (80%) | 150 mi (50%) | 200 mi (66%) | 250 mi (63%) | n/a |
| Extended (340 mi) | 320 mi (80%) | 150 mi (50%) | 200 mi (66%) | 250 mi (63%) | n/a |
| Daily (280 mi) | 280 mi (70%) | 150 mi (50%) | 200 mi (50%) | 250 mi (63%) | n/a |

TABLE 3

| 135 kWh Battery pack | | Starting SOC | |
|---|---|---|---|
| | x < 30% | 30% < x < 50% | 50% < x < 80% |
| Range Selection | Peg 2 Value | Peg 1 Value | |
| Trip (300 mi) | 80% (240 mi) | 50% (150 mi) | 67% (200 mi) | n/a |
| Extended (255 mi) | 80% (240 mi) | 50% (150 mi) | 67% (200 mi) | n/a |
| Daily (210 mi) | 70% (210 mi) | 50% (150 mi) | 58% (175 mi) | n/a |

TABLE 4

| 180 kWh Battery pack | | Starting SOC | | |
|---|---|---|---|---|
| | x < 25% | 25% < x < 37.5% | 37.5% < x < 50% | 50% < x < 80% |
| Range Selection | Peg 2 Value | Peg 1 Value | | |
| Trip (400 mi) | 80% (320 mi) | 37.5% (150 mi) | 50% (200 mi) | 63% (250 mi) | n/a |
| Extended (340 mi) | 80% (320 mi) | 37.5% (150 mi) | 50% (200 mi) | 63% (250 mi) | n/a |
| Daily (280 mi) | 70% (280 mi) | 37.5% (150 mi) | 50% (200 mi) | n/a | n/a |

At 201, processing circuitry 102 may determine, based on charging information received from battery system 108, that the current charge level indicated at 224 (corresponding to the current charging range indicated at 211, e.g., 151 miles) depicted in charge level status meter 205 has equaled or exceeded the intermediate charging range indicated at 206 associated with first peg indicator 204. Thus, processing circuitry 102 and/or output circuitry 116 may modify the appearance or presentation of one or more of first peg indicator 204 and/or indications 206 and 208 of the intermediate charging range and the estimated time to reach the intermediate charging range, respectively (e.g., cease generating for display one or more of first peg indicator 204 and/or indication 206 of the intermediate charging range and the indication 208 of the estimated charge time to reach the intermediate charging range, and/or gray out one or more of first peg indicator 204 and/or the indications 206, 208 so that these indications are featured less prominently and are not emphasized to the driver, etc.). In some embodiments, a notification may be output (e.g., at display 130 and/or user device 138) indicating to the driver that the intermediate charging range indicated at 206 has been reached. In some embodiments, the charge time indicated at 214 may continue to be updated (e.g., decrease) as the charge level indicated at 224 and corresponding to the current SOC of battery 110 increases, and second peg indicator 210 may continue to be generated for display by processing circuitry 102. In some embodiments, second peg indicator 210 may not be generated for presentation until the current charge level eclipses first peg indicator 204, or first peg indicator 204 may be emphasized or displayed more prominently than second peg indicator 210 until the current charge level eclipses first peg indicator 204, at which point second peg indicator 210 may be displayed more prominently than first peg indicator 204. In some embodiments, the charging range indicated at 206 and first peg indicator 204 may continue to be displayed, even after battery 110 has been charged to the charge level indicated at 224 that exceeds the charge level associated with first peg indicator 204, to show that battery 110 of electric vehicle 101 has at least the charging range indicated at 206.

At 203, processing circuitry 102 may determine, based on charging information received from battery system 108, that the current charge level indicated at 226 (corresponding to the current charging range indicated at 213, e.g., 321 miles) depicted in charge level status meter 205 has equaled or exceeded the charging range indicated at 212 associated with the range selection and second peg indicator 210. Thus, processing circuitry 102 and/or output circuitry 116 may modify the appearance of second peg indicator 210 and/or the indications 212 and 214 of charging range 212 and estimated charge time 214, respectively (e.g., cease generating for display one or more of second peg indicator 210 and/or indications 212 and 214, and/or gray out second peg indicator 210 and/or indications 212 and 214). In some embodiments, a notification may be output (e.g., at display 130 and/or user device 138) indicating to the driver that charging range 212 has been reached. In some embodiments, one or more of indication 212 of the charging range, indication 214 of the estimated time to reach the charging range, and the indication of second peg indicator 210 may continue to be displayed, even after battery 110 has been charged to charge level 226 that exceeds the charge level associated with peg indicator 210, to show that electric vehicle 101 has at least the charging range indicated at 212.

Figure 3:
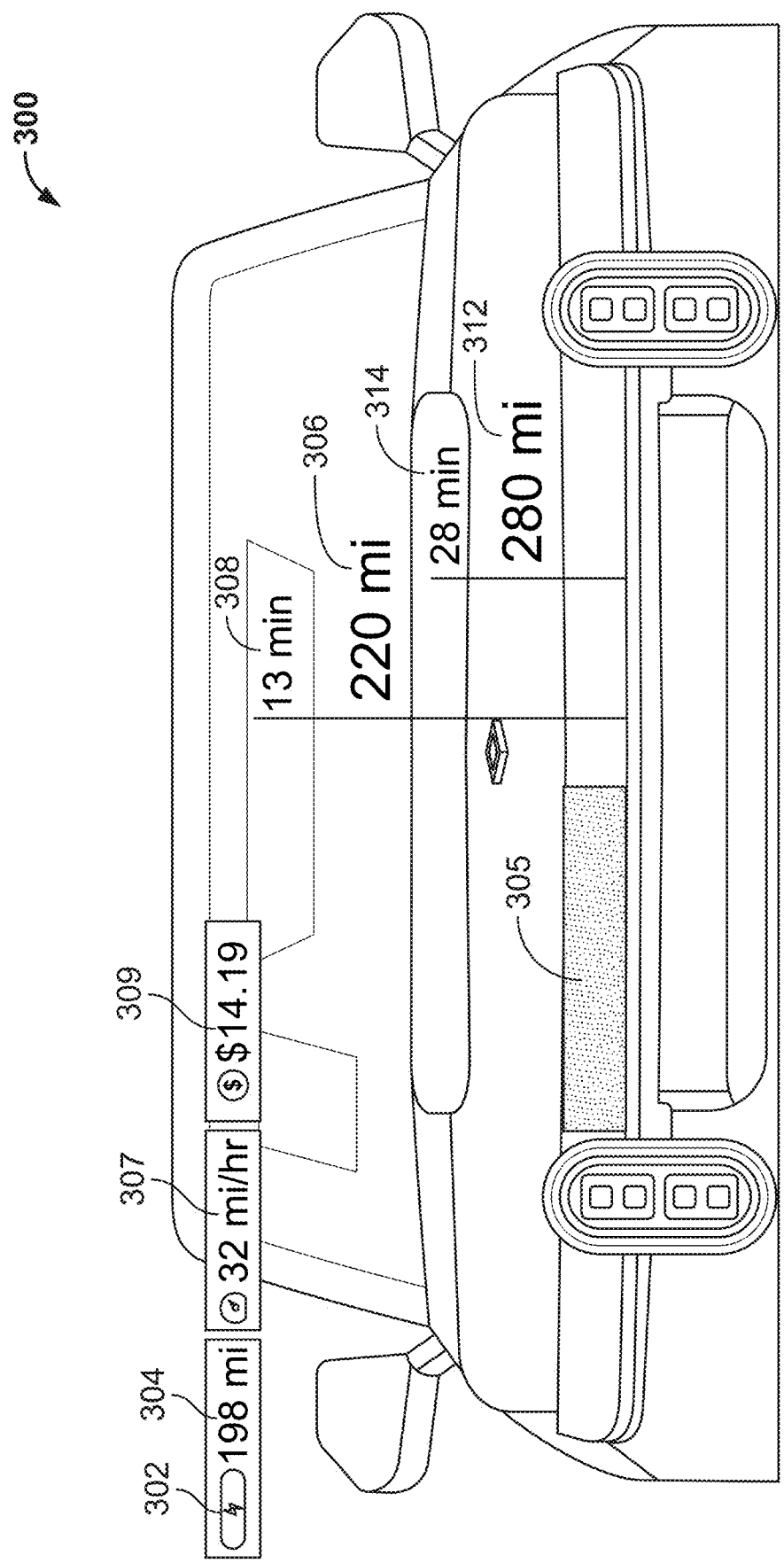
FIG. 3 shows an exemplary graphical user interface providing information including an intermediate charging range and estimated time to reach the intermediate charging range, in accordance with some embodiments of the present disclosure.

FIG. 3 shows an exemplary graphical user interface (GUI) 300 providing information including the intermediate charging range indicated at 306 and the estimated time, indicated at 308, to reach the intermediate charging range, in accordance with some embodiments of the present disclosure. GUI 300 may be provided at display 130 of vehicle 101 and/or a display of user device 138 and/or a display of charger 114 while vehicle 101 is being operated (e.g., driven) and/or while vehicle 101 is being charged at charger 114 (e.g., at a home or public charging station). GUI 300 may include charge icon 302 indicating whether battery 110 of vehicle 101 is currently being charged, current vehicle range indicator 304, speed indicator 307 (e.g., average speed over a period of time or a current speed) as determined by speed sensor 126, and a cost 309 of charging battery 110 to a particular charge level. GUI 300 may further include a charge level status meter 305 indicating a difference between a current level of charge and the intermediate charging range indicated at 306 and a charging range indicated at 312 associated with the range selection, as well as an estimated charge time indicated at 308 to reach the intermediate charging range indicated at 306 and an estimated charge time indicated at 314 to reach the charging range indicated at 312. As discussed, processing circuitry 102 and/or output circuitry 120 may generate for presentation GUI 300 based on the information in one or more of the aforementioned Tables 1-4, the range selection, intermediate charging range 306 and driver history stored in memory 106.

Figure 4:
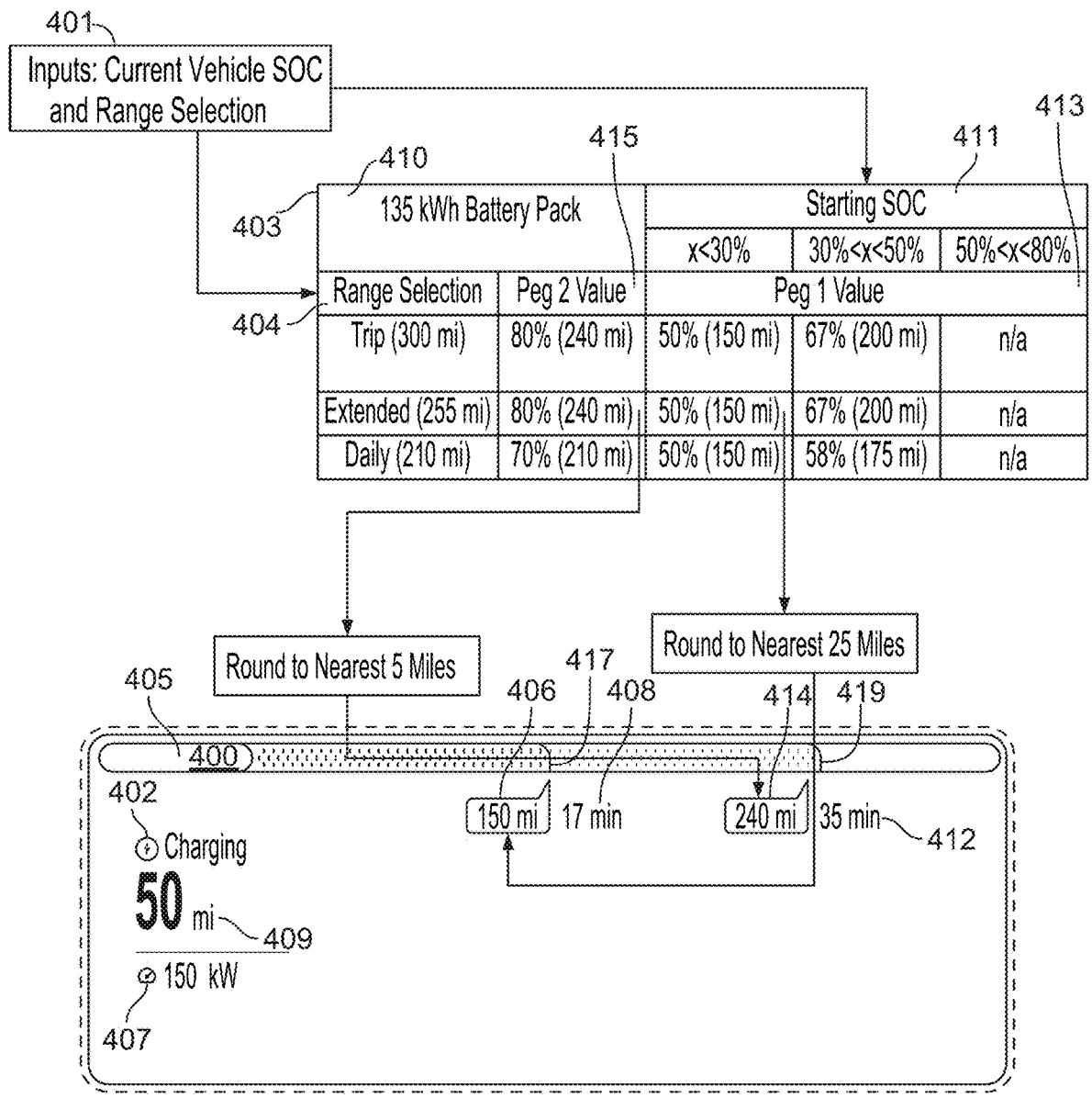
FIG. 4 shows an exemplary technique for generating a graphical user interface providing information including an intermediate charging range and estimated time to reach the intermediate charging range, in accordance with some embodiments of the present disclosure.

FIG. 4 shows an exemplary technique for generating a graphical user interface 400 providing information including an intermediate charging range indicated at 406 and an estimated time indicated at 408 to reach the intermediate charging range, in accordance with some embodiments of the present disclosure. GUI 400 may include indication 402 that vehicle 101 is currently being charged by electric charger 114 (e.g., a 150 kW output power charger as indicated at 407) and charge level status meter 405 indicating a current charge level of battery 110. In some embodiments, GUI 400 may include an indication 409 of a current vehicle range (e.g., 50 miles). Processing circuitry 102 may determine the estimated charge time indicated at 408, included in GUI 400, for the intermediate charging range indicated at 406 provided in GUI 400, and the estimated charge time indicated at 412, included in GUI 400, for the charging range indicated at 414 and associated with the range selection. In some embodiments, processing circuitry may select table 403 from among multiple tables stored in memory 106 based on determining that a type of battery of battery 110 of vehicle 101 (e.g., determined based on information received from battery system 108) corresponds to the battery type indicated at 410 as being associated with table 403 (e.g., 135 kWh battery pack).

Processing circuitry 102 may determine a range selection (e.g., based on a usage selection input of one of "Trip", "Extended", and "Daily") and the current vehicle range indicated at 409. The range selection may be broken into multiple categories (e.g., three), as discussed above with reference to the tables 1-4, namely, "Trip," "Extended," and "Daily," each with an estimated range that is suitable for the amount of traveling represented by the category, and processing circuitry 102 may receive user input of the range selection by selecting one of these options. Additionally or alternatively, processing circuitry 102 may receive input by the user specifying a specific destination with a known range, and the range selection may be determined based on such input, and/or the range selection may be predicted based on user driving patterns and/or previous destinations traveled to by the user, as specified in a user profile stored in memory 106 and/or memory of user device 138.

As shown in FIG. 4, table 403 (e.g., corresponding to the above-described Table 3) may be used as a lookup table, e.g., a range selection from among the options ("Trip"; "Extended"; "Daily") shown at 404 and a current vehicle range (e.g., received from battery system 108) may be received as inputs 401, and based on such inputs, table 403 may be used to determine the intermediate charging range indicated at 406 and the charging range associated with the range selection and indicated at 414. In some embodiments, the intermediate charging range indicated at 406 (associated with first peg indicator 417) may be determined based on each of the range selection and current vehicle range input at 401, and the charging range associated with second peg indicator 419 may be determined based on the range selection alone. As discussed above, the indicators and/or associated information indicators of charge level status meter 405, and charge levels status meter 405 itself, may be presented in any suitable manner (e.g., in any color, font, size or shape). As shown in FIG. 4, if the current vehicle range indicated at 409 is determined to be 50 miles (e.g., a state-of-charge of less than 30% of the maximum charging range of battery 110) and the range selection is determined to correspond to "Extended", processing circuitry 102 may use portion 411 of lookup table 403 to determine that the intermediate charging range indicated at 406 (e.g., the Peg 1 value column 413 in table 403) of 50% state-of-charge (150 miles) may be suitable (based on a current vehicle range being less than 30% and the "Extended" range selection), and processing circuitry 102 may user portion 404 of table 403 to determine a charging range indicated at 414 that is associated with second peg indicator 419 (e.g., corresponding to the Peg 2 value column 415 in table 403) and the range selection. In some embodiments, a driving history of vehicle 101 may be taken into consideration, in addition or alternative to the information in table 403, in determining the intermediate charging range indicated at 406, e.g., based on referencing the user profile of the driver. In some embodiments, GUI 400 may be rounded for ease of consumption by the driver of vehicle 101 (e.g., rounded to the nearest increment of 5 or 25).

Figure 5:
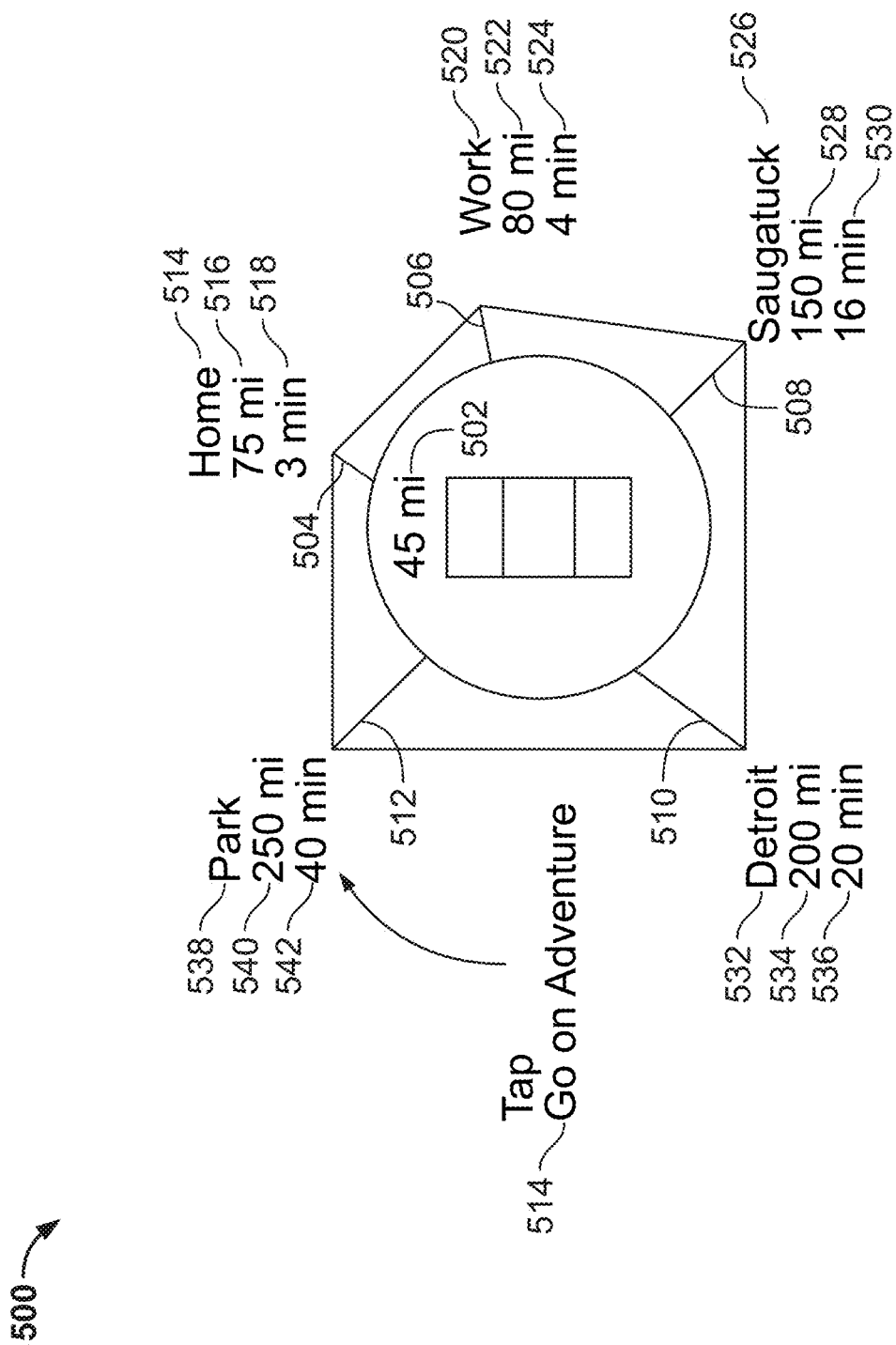
FIG. 5 shows an exemplary suggesting a plurality of destinations based on a current vehicle location, in accordance with some embodiments of this disclosure.

FIG. 5 shows an exemplary spider map 500 suggesting a plurality of destinations based on a current vehicle location, in accordance with some embodiments of this disclosure. Spider map 500 may be displayed via display 130 and/or user device 138 and/or a display of charger 114, and may comprise an indication 502 of a current vehicle range (e.g., 45 miles) that vehicle 101 is capable of traveling under the current charging conditions of battery 110, and branches 504, 506, 508, 510 and 512. Each branch may be associated with a respective location indication 514, 520, 526, 532, 538; charging range indication 516, 522, 528, 534, 540; and estimated charge time indication 518, 524, 530, 536, 542, to reach the corresponding charging range to reach the corresponding location. In some embodiments, the locations may be determined based on a monitored driving history of vehicle 101 (e.g., stored in memory 106 in connection with a user profile of the driver), to determine anticipated navigation locations, and the charging ranges may correspond to respective intermediate charging ranges. For example, location 514 may correspond to "Home", which processing circuitry 102 may determine is a location the driver of electric vehicle 101 frequently travels to, and which requires a charging range indicated at 516 of 75 miles, and requires 3 minutes of charge time, as indicated at 518, to reach charging range 516. In some embodiments, processing circuitry 102 may take into account certain traffic patterns (e.g., based on information received from GPS 134) in identifying which locations to suggest (e.g., omitting certain locations that have a higher amount of traffic than normal) or analyze certain weather patterns (e.g., suggesting a beach destination if weather is better than normal). In some embodiments, processing circuitry 102 may employ a buffer when identifying the required charging range (e.g., to provide a cushion of extra distance beyond the distance to reach the associated destination). In some embodiments, spider map 500 may be overlaid on a navigation interface (e.g., provided based on information received from GPS 134), and may permit a driver to change a current navigation destination to (or otherwise input as the navigation destination) a destination indicated by spider map 500. In some embodiments, a length of the branches 504, 506, 508, 510, 512 may vary based on computed respective distances of vehicle 101 from the respective locations associated with the branches. For example, branch 504 may correspond to a shorter length than branch 512, to indicate to the driver that the indicated location 514 associated with branch 504 is closer to the current location of vehicle 101 than the indicated location 538 associated with branch 512.

In some embodiments, processing circuity 102 may receive selection from the driver (e.g., via input interface 122) regarding how many branches to include in spider map 500, and/or a maximum distance away that a destination can be included in spider map 500, and/or a predefined area from which to select locations for spider map 500. In some embodiments, spider map 500 may be associated with a selectable adventure option 514, e.g., selectable by driver via input interface 122, which may suggest a destination that is a popular adventurous outing that the user may or may not normally travel to (e.g., the "Park" destination indicated at 538). In some embodiments, processing circuitry 102 may check whether a charging station is at or within a predetermined distance of a location prior to suggesting the location as part of spider map 500. In some embodiments, the locations included in spider map 500 may be determined based at least in part on the range selection.

Figure 6:
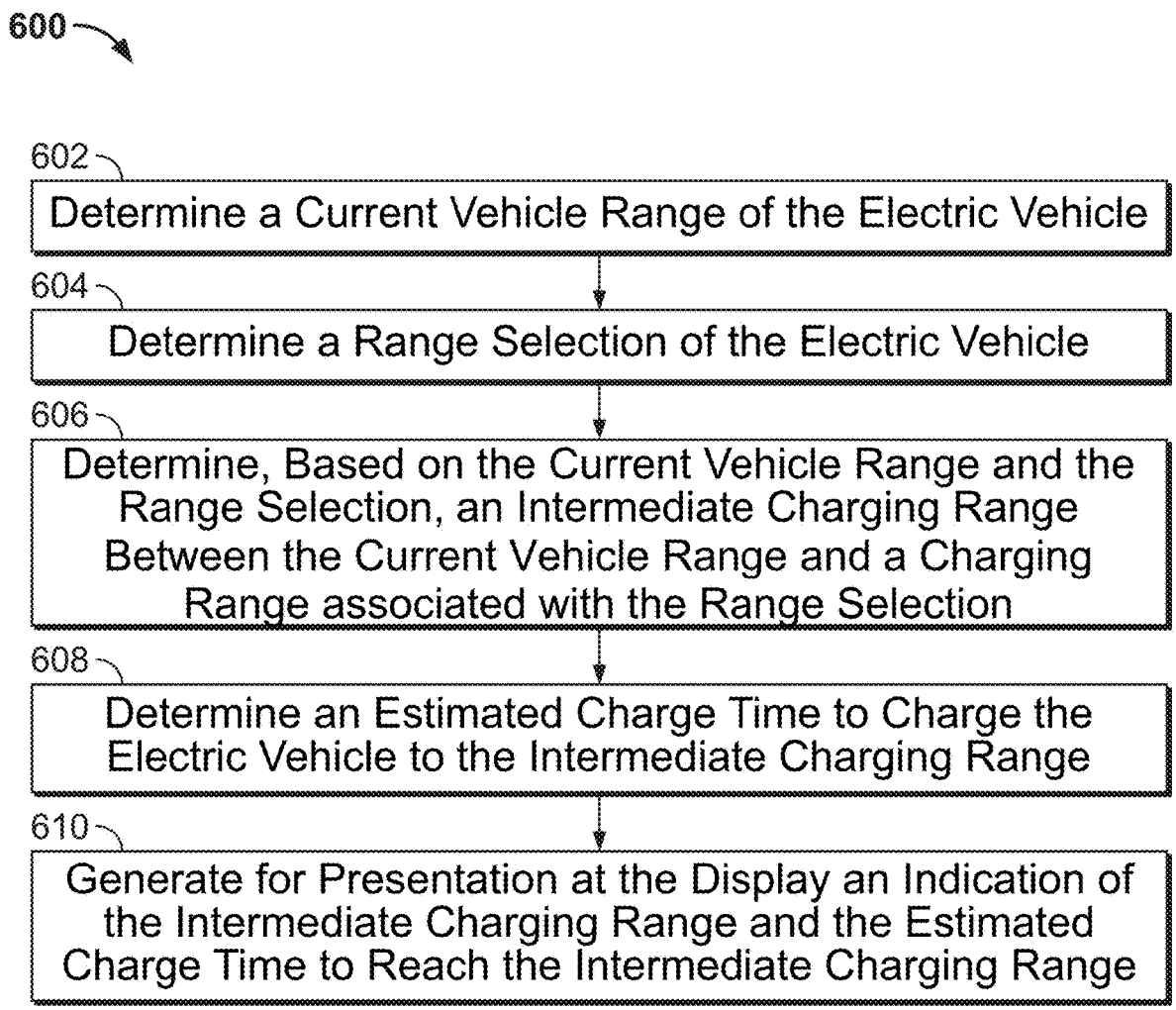
FIG. 6 shows a flowchart of an illustrative process for providing information including an intermediate charging range and estimated time to reach the intermediate charging range, in accordance with some embodiments of the present disclosure.

FIG. 6 shows a flowchart of an illustrative process for providing information including an intermediate charging range and estimated time to reach the intermediate charging range, in accordance with some embodiments of the present disclosure. Process 600 may be executed at least in part by processing circuitry 102.

At 602, processing circuitry 102 may determine a current vehicle range, indicated at 304, of electric vehicle 101, e.g., by requesting information from battery system 108 regarding a current charge level of electric battery 110. Processing circuitry 102 may be configured to compute, as the current vehicle range, a number of miles or kilometers that electric vehicle 101 is capable of traveling based on the charge level of electric battery 110.

At 604, processing circuitry 102 may determine a range selection, received as input at 401 and/or otherwise determined based on a current destination or based on driving habits of electric vehicle 101. For example, input circuitry 116 may receive, and determine the range selection from among the categories delineated in column 404 of table 403 based on, one or more of selections received via input interface 122 (e.g., a usage selection of "Daily," "Extended", or "Trip," as shown in FIG. 4) or input of a vehicle destination (e.g., a destination as shown in FIG. 5).

At 606, processing circuitry 102 may determine, based on the current vehicle range indicated at 409 and a charging range indicated at 414 and associated with the range selection, an intermediate charging range indicated at 406 of FIG. 4 (e.g., 150 miles) between the current vehicle range indicated at 409 (e.g., 50 miles) and the charging range indicated at 414 (e.g., 240 miles) associated with the range selection. For example, processing circuitry 102 may use table 403 as a lookup table which takes as input 401 the current vehicle range indicated at 409 (e.g., 50 miles corresponding to less than 30% SOC in column 411 of table 403) and the range selection (e.g., "Daily" usage selection) and outputs Peg 1 value associated with column 411 of table 403 of 150 miles (e.g., corresponding to peg indicator 417 associated with the intermediate charging range indicated at 406).

At 608, processing circuitry 102 may determine an estimated charge time indicated at 408 to charge electric vehicle 101 to the intermediate charging range indicated at 406. For example, processing circuitry 102 may communicate with battery system 108 to determine a power level associated with charger 114 (e.g., a DC fast charger), and based on the current vehicle range indicated at 409 of vehicle 101, compute the estimated charge time indicated at 408 to reach the intermediate charging range indicated at 406.

At 610, processing circuitry 102 may be configured to cause output circuitry 120 to generate for presentation at display 130 and/or user device 138 an indication of intermediate charging range indicated at 406 and the estimated charge time indicated at 408 to reach the intermediate charging range indicated at 406, thereby providing a driver of electric vehicle 101 with convenient information (e.g., to potentially spend less time at a current electric charger, since display 130 and/or user device 138 and/or charger 114 may provide information for the driver to determine that the intermediate charging range indicated at 406 is sufficient for anticipated navigation at a current time).

Figure 7:
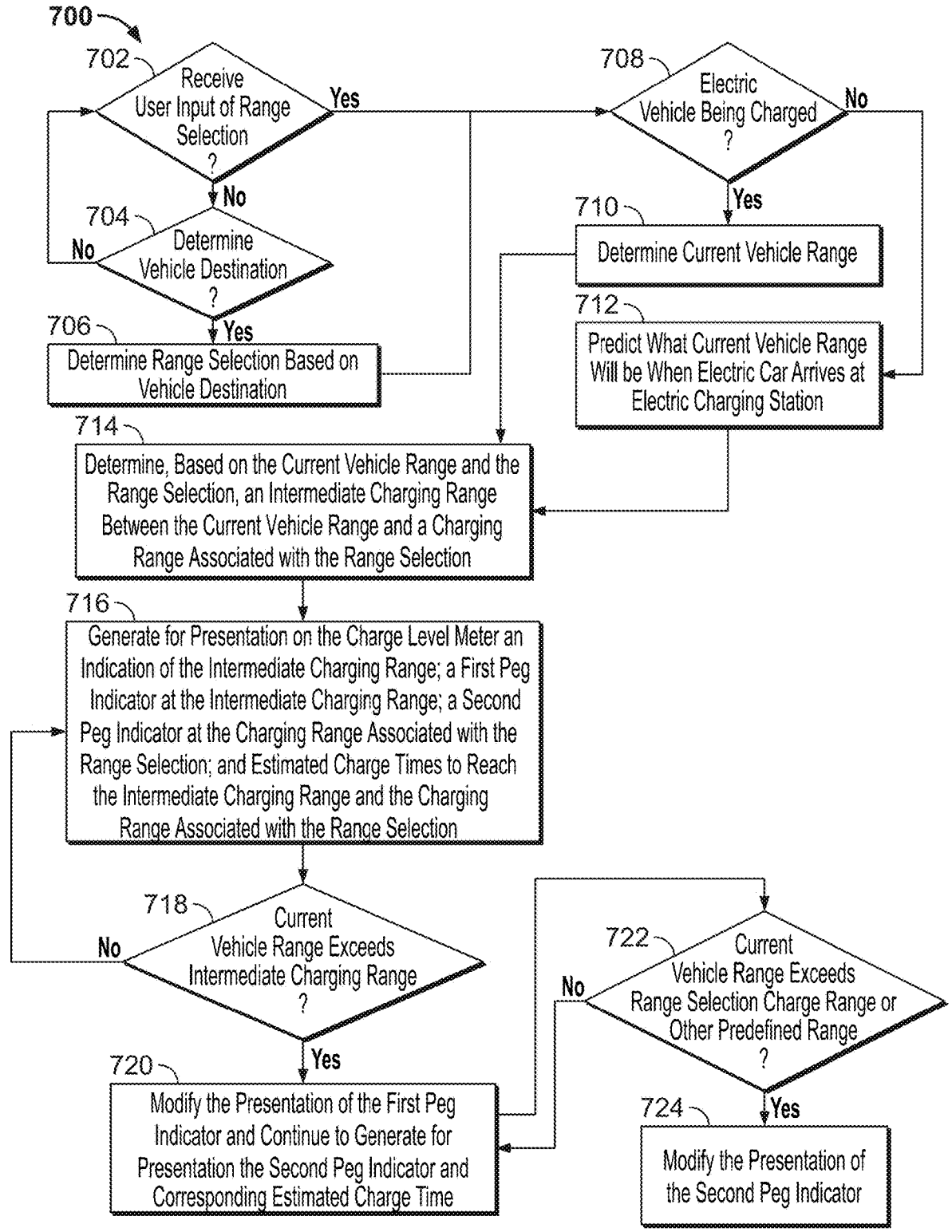
FIG. 7 shows a flowchart of an illustrative process for providing information including an intermediate charging range and estimated time to reach the intermediate charging range, in accordance with some embodiments of the present disclosure.

FIG. 7 shows a flowchart of an illustrative process for providing information including an intermediate charging range and estimated time to reach the intermediate charging range, in accordance with some embodiments of the present disclosure. Process 700 may be executed at least in part by processing circuitry 102.

At 702, processing circuitry 102 may determine whether user input of a range selection (e.g., corresponding to one of the categories depicted in 404) is received (e.g., input of "Daily" or "Trip" shown in FIG. 4) via input circuitry 116. In some embodiments, the range selection is additionally or alternatively determined based on a standard charging range (e.g., 80% of the capacity of battery 110). Upon determining such input has been received, processing may proceed to 708. Otherwise, processing circuitry 102 may proceed to 704. In some embodiments, the range selection may be predicted, such as, for example, in the event that a destination is unknown and user input has not been received. For example, processing circuitry may determine the range selection based on a current time or day of the week (e.g., "Daily" for weekdays and "Trip" for weekends).

At 704, processing circuitry 102 may determine whether a vehicle destination has been entered or otherwise predicted (e.g., based on vehicle 101 driving history, and determining that at this particular time and day of the week vehicle 101 normally travels to the same location). Upon determining such vehicle destination has been input or predicted, processing may proceed to 706. Otherwise, processing may return to 702.

At 706, processing circuitry 102 may determine the range selection indicated at 414 based on vehicle destination. For example, processing circuitry may determine a route to the vehicle destination and calculate a route distance as the range selection. In some embodiments, a buffer is added to the route distance, and/or the range selection is rounded up to a nearest mileage increment (e.g., 5, 10, or 25 miles).

At 708, processing circuitry 102 may optionally determine whether electric vehicle 101 is being charged at charger 114. For example, processing circuitry 102 may communicate with battery system 108 to check whether vehicle 101 is currently being charged and/or determine location information of vehicle 101 (e.g., based on GPS 134) to determine whether vehicle 101 is located at a charging station.

At 710, in response to determining that vehicle 101 is being charged at charger 114, processing circuitry 102 may determine current vehicle range indicated at 304 (e.g., 198 miles) based on a state-of-charge of electric battery 110 of electric vehicle (e.g., determined based on information processing circuitry 102 receives from battery system 108).

At 712, in response to determining that vehicle 101 is not being charged, processing circuitry 102 may predict what the current vehicle range will be when electric car 101 arrives at an electric charging station having a charger 114. For example, processing circuitry 102 may determine that the electric charging station is 10 miles away (e.g., based on information from GPS 134) from a current location of vehicle 101, and that the current charging range of vehicle 101 indicated at 409 is 50 miles, and thus the current charging range will be 40 miles when vehicle 101 arrives at the charging station.

At 714, processing circuitry 102 determines, based on the current vehicle range indicated at 304 and the charging range indicated at 312 associated with the range selection, that the intermediate charging range indicated at 306 between the current vehicle range indicated at 304 and the charging range indicated at 312 and associated with the range selection. 714 may be performed in a similar manner as 606 of FIG. 6.

At 716, processing circuitry 102 may cause output circuitry 120 and/or user device 138 to generate for presentation the indicator 206 associated with the intermediate charging range; first peg indicator 204 corresponding to intermediate charging range indicated at 206 on charge level status meter 205; second peg indicator 210 at charging range 210 associated with the range selection, on charge level status meter 205; and estimated charge times indicated at 208, 214 to reach intermediate charging range indicated at 206 and the charging range indicated at 210, respectively. In some embodiments, such presentation may occur regardless of whether vehicle 101 is being charged. In some embodiments, if vehicle 101 is not being charged, estimated charge times indicated at 208, 214 may be computed based on the expected current vehicle range when vehicle 101 arrives at electric charger 114 (e.g., determined to be within a predefined distance from vehicle 101 such that vehicle 101 has sufficient range to navigate to the electric charging station having charger 114).

At 718, processing circuitry 102 may determine whether a current charging range (e.g., corresponding to the charge level indicated at 202) exceeds the intermediate charging range indicated at 206. For example, processing circuitry 102 may receive current charging range information from battery system 108 and compares the current charging range information to the intermediate charging range indicated at 206. Upon determining that current charging range does not exceed intermediate charging range indicated at 206, processing circuitry 102 may wait until this is the case. Upon determining that current charging range (e.g., corresponding to the charge level indicated at 224) exceeds intermediate charging range 206, processing may proceed to 720.

At 720, processing circuitry 102 may cause output circuitry 120 and/or user device 138 to modify the presentation of first peg indicator 204 (and/or the charging range indicated at 206 and/or estimated charge time indicated at 208) and continue to generate for presentation second peg indicator 210 and/or the corresponding charging range 212 and/or estimated charge time indicated at 214, which may be continuously updated to decrease as the charge level indicated in charge level status meter 205 increases from the indication of 202 to the indication of 204. In some embodiments, second peg indicator 210 may not be generated for presentation until intermediate charging range indicated at 206 is exceeded. In some embodiments, modifying presentation of first peg indicator 204 (and/or the charging range indicated at 206 and/or estimated charge time indicated at 208) may comprise processing circuitry 102 causing output circuitry 120 and/or user device 138 to cease the generating for display of first peg indicator 204 (and/or the charging range indicated at 206 and/or the estimated charge time indicated at 208). In some embodiments, modifying presentation of first peg indicator 204 (and/or the charging range indicated at 206 and/or estimated charge time indicated at 208) may comprise causing output circuitry 120 and/or user device 138 to change the appearance of first peg indicator 204 (and/or the charging range indicated at 206 and/or estimated charge time indicated at 208) rather than ceasing to generate for display first peg indicator 204 and the associated indications. For example, first peg indicator 204 (and/or the charging range indicated at 206 and/or estimated charge time indicated at 208) may be grayed out or otherwise de-emphasized when a current charge level is determined to exceed first peg indicator 204.

At 722, processing circuitry 102 may determine whether the current vehicle range (e.g., corresponding to the charge level indicated at 226) exceeds the charging range indicated at 212, e.g., associated with the range selection, or another predefined range (e.g., a standard range, such as, for example, 80% of battery capacity, or a fully-charged battery, which may optionally be specified by the driver). Upon determining that the current charging range does not exceed the charging range indicated at 212, processing circuitry may wait until this is the case. Upon determining that current charging range (e.g., corresponding to charge level 226) exceeds the charging range indicated at 212, processing may proceed to 724.

At 724, processing circuitry 102 may cause output circuitry 120 and/or user device 138 to modify the appearance of second peg indicator 210 (and/or the charging range indicated at 212 and/or estimated charge time indicated at 214), in response to determining that the current charging range (e.g., corresponding to the charge level indicated at 226) exceeds the charging range indicated at 212. In some embodiments, processing circuitry 102 may additionally cease charging vehicle 101. In some embodiments, modifying presentation of second peg indicator 210 (and/or the charging range indicated at 212 and/or estimated charge time indicated at 214) may comprise processing circuitry 102 causing output circuitry 120 and/or user device 138 to cease the generating for display of second peg indicator 210

(and/or the charging range indicated at 212 and/or estimated charge time indicated at 214). In some embodiments, modifying presentation of second peg indicator 210 (and/or the charging range indicated at 212 and/or estimated charge time indicated at 214) may comprise causing output circuitry 120 and/or user device 138 to change the appearance of second peg indicator 210 (and/or the charging range indicated at 212 and/or estimated charge time indicated at 2148) rather than ceasing to generate for display second peg indicator 210 and the associated indications. For example, second peg indicator 210 (and/or the charging range indicated at 212 and/or estimated charge time indicated at 214) may be grayed out or otherwise de-emphasized when a current charge level is determined to exceed second peg indicator 210.

Figure 8:
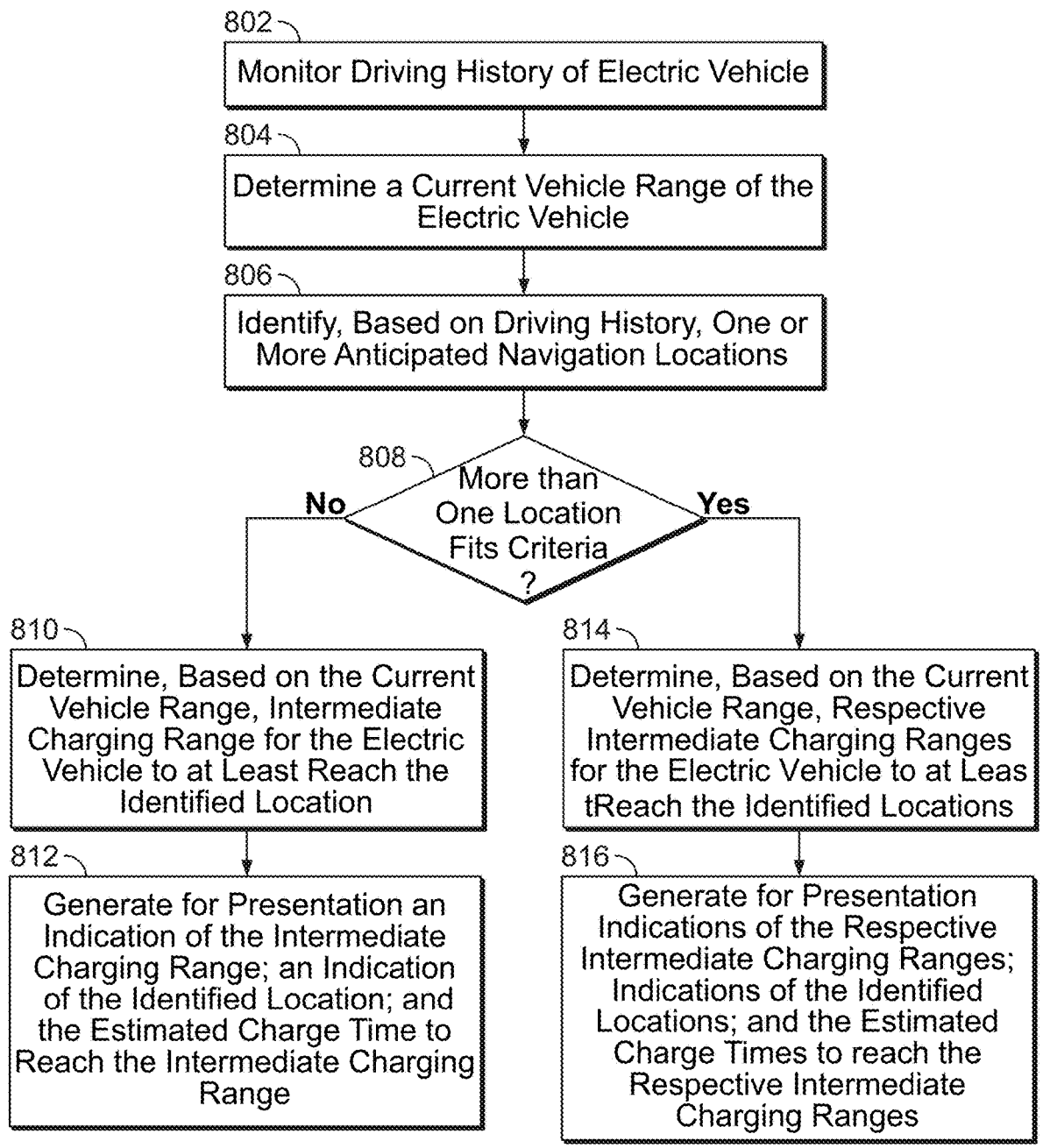
FIG. 8 shows a flowchart of illustrative process for determining whether to provide a spider map of suggested destinations, in accordance with some embodiments of the present disclosure.

FIG. 8 shows a flowchart of illustrative process for determining whether to provide a spider map (e.g., spider map 500 in FIG. 5) of suggested destinations, in accordance with some embodiments of the present disclosure. Process 800 may be executed at least in part by processing circuitry 102.

At 802, processing circuitry 102 may monitor a driving history of electric vehicle 101. For example, processing circuitry 102 may reference GPS information associated with GPS 134 and/or information stored at user device 138 to determine common destinations traveled to or aligning with interests stored in a user profile of the driver (e.g., stored in memory 106 and/or memory of user device 138) of electric vehicle 101. In some embodiments, memory 106 may store relationships between a time of day, a time of year and/or a day of week that the electric vehicle previously traveled to various destinations.

At 804, processing circuitry 102 may determine a current vehicle range (e.g., 50 miles indicated at 409) of electric vehicle 101. 804 may be performed in a similar manner as 602 of FIG. 6.

At 806, processing circuitry 102 may identify, based on the monitored driving history, one or more anticipated navigation locations. For example, locations 514, 520, 526, 532 and/or 538 may be identified as destinations that the driver of vehicle 101 may likely be interested in navigating to (e.g., locations the electric vehicle previously or normally travels to at similar times as the current time, or may be interested traveling to, based on the user profile).

At 808, processing circuitry 102 may determine whether more than one location has been identified. If only one location has been identified, processing may proceed to 810. If more than one location has been identified, processing may proceed to 814.

At 810, processing circuitry 102 may determine, based on the current vehicle range indicated at 304, the intermediate charging range indicated at 306 for electric vehicle 101 to at least reach the identified location. For example, an intermediate charging range to at least enable a user to reach a detour (e.g., a hotel), on the way to an ultimate destination (e.g., a relative's home) and that electric vehicle 101 frequently travels to, may be determined as intermediate charging range 306.

At 812, processing circuitry 102 may generate for presentation an indication of the intermediate charging range indicated at 306, an indication of the identified location (e.g., the name of the hotel associated with above-mentioned detour), and an estimated charge time indicated at 308 to reach the intermediate charging range indicated at 306.

At 814, processing circuitry 102 may determine, based on the current vehicle range indicated at 502 (e.g., 45 miles), respective intermediate charging ranges (e.g., 516, 522, 528, 534, 540) for electric vehicle 101 to at least reach identified locations 514, 520, 516, 532 and/or 538. At 816, processing circuitry 102 may generate for presentation (e.g., at display 130 and/or user device 138) spider map 500 comprising respective intermediate charging ranges indicated at 516, 522, 528, 534, 540; identified locations indicated at 514, 520, 516, 532 and/or 538; and estimated charge times indicated at 518, 524, 530, 536, 542 to reach the respective intermediate charging ranges. For example, spider map 500 may indicate that a 4 minute estimated charge indicated at 524 is required to enable vehicle 101 to navigate to the place of work of the driver of vehicle 101. In some embodiments, a buffer may be utilized in the intermediate charging range (e.g., the place of work may be 35 miles away, but an indication of 80 miles enables electric vehicle 101 to make a round trip with miles to spare). In some embodiments, the relative positioning of the identified locations in spider map 500 is based on relative directions of the locations relative to vehicle 101.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system for estimating charge time for an electric vehicle, the system comprising:
 a display; and
 processing circuitry configured to:
  determine a current vehicle range of the electric vehicle;
  determine a range selection of the electric vehicle based on a user selection;
  determine, based on the current vehicle range and a charging range associated with the range selection, an intermediate charging range between the current vehicle range and the charging range associated with the range selection;
  determine an estimated charge time to charge the electric vehicle to the intermediate charging range; and
  generate for presentation at the display an indication of the intermediate charging range and the estimated charge time to reach the intermediate charging range.

2. The system of claim 1, wherein the processing circuitry is configured to determine the range selection based on a vehicle destination.

3. The system of claim 1, wherein the processing circuitry is configured to determine the range selection range by receiving a user inputted-range selection, wherein the user inputted-range selection corresponds to a usage selection.

4. The system of claim 1, wherein the indication of the intermediate charging range comprises a distance the electric vehicle can be driven at the intermediate charging range.

5. The system of claim 3, wherein the usage selection corresponds to a daily usage selection, an extended usage selection, or a trip usage selection, each of the daily usage selection, the extended usage selection, and the trip usage selection being associated with a respective distance estimation.

6. The system of claim 1, wherein;
the processing circuitry is configured to determine the intermediate charging range by:
monitoring a driving history of the electric vehicle;
identifying, based on the driving history, a plurality of anticipated navigation locations of the electric vehicle; and
determining a plurality of intermediate charging ranges, each respective intermediate charging range enabling the electric vehicle to reach a respective location of the plurality of identified anticipated navigation locations; and
the processing circuitry is configured to generate for presentation each indication of the intermediate charging range and each estimated charge time to reach the intermediate charging range by:
generating for presentation:
a plurality of indications corresponding to the plurality of anticipated navigation locations, respectively; and
a plurality of indications of the respective intermediate charging ranges associated with the plurality of anticipated navigation locations.

7. The system of claim 1, wherein the intermediate charging range is less than 80% of a charge capacity of a battery of the electric vehicle.

8. The system of claim 1, wherein the processing circuitry is configured to determine the intermediate charging range by:
referencing a look-up table stored in memory, the look-up table indicating a plurality of intermediate charging range values and corresponding current vehicle range values and corresponding charging range values associated with respective range selections; and
determining the intermediate charging range using the look-up table and based on the determined current vehicle range and the charging range associated with the determined range selection.

9. The system of claim 1, wherein the processing circuitry is further configured to:
generate for presentation a charge level status meter, wherein a first position of the charge level status meter represents the current vehicle range, and a first peg indicator at a second position of the charge level status meter represents the intermediate charging range.

10. The system of claim 9, wherein the processing circuitry is further configured to:
generate for presentation, at a third position of the charge level status meter:
a second peg indicator representing the charging range associated with the range selection, wherein the third position is located further along the charge level status meter than the first position and the second position; and
an estimated charge time to reach the charging range associated with the range selection; and
in response to determining that the current vehicle range has reached the intermediate charging range:
modify the generating for presentation of the first peg indicator associated with the intermediate charging range; and
continue to generate for presentation the second peg indicator and the estimated charge time to reach the range selection charging range.

11. A method for estimating charge time for an electric vehicle, the method comprising:
determining a current vehicle range of the electric vehicle;
determining a range selection of the electric vehicle based on a user selection;
determining, based on the current vehicle range and a charging range associated with the range selection, an intermediate charging range between the current vehicle range and the charging range associated with the range selection;
determining an estimated charge time to charge the electric vehicle to the intermediate charging range; and
generating for presentation an indication of the intermediate charging range and the estimated charge time to reach the intermediate charging range.

12. The method of claim 11, wherein the range selection is determined based on a vehicle destination.

13. The method of claim 11, wherein determining the range selection range comprises receiving a user inputted range selection, and wherein the user inputted-range selection corresponds to a usage selection.

14. The method of claim 11, wherein the indication of the intermediate charging range comprises a distance the electric vehicle can be driven at the intermediate charging range.

15. The method of claim 11, wherein the usage selection corresponds to a daily usage selection, an extended usage selection, or a trip usage selection, each of the daily usage selection, the extended usage selection, and the trip usage selection being associated with a respective distance estimation.

16. The method of claim 11, wherein:
determining the intermediate charging range comprises:
monitoring a driving history of the electric vehicle;
identifying, based on the driving history, a plurality of anticipated navigation locations of the electric vehicle; and
determining a plurality of intermediate charging ranges, each respective intermediate charging range enabling the electric vehicle to reach a respective location of the plurality of identified anticipated navigation locations; and
generating for presentation the indication of each intermediate charging range and the estimated charge time to reach each intermediate charging range comprises:
generating for presentation:
a plurality of indications corresponding to the plurality of anticipated navigation locations, respectively; and
a plurality of indications of the respective intermediate charging ranges associated with the plurality of anticipated navigation locations.

17. The method of claim 11, wherein the determining the intermediate charging range comprises:
referencing a look-up table stored in memory, the look-up table indicating a plurality of intermediate charging range values and corresponding current vehicle range values and corresponding charging range values associated with respective range selections; and
determining the intermediate charging range using the look-up table and based on the determined current vehicle range and the charging range associated with the determined range selection.

18. The method of claim 11, further comprising:
generating for presentation a charge level status meter, wherein a first position of the charge level status meter represents the current vehicle range, and a first peg indicator at a second position of the charge level status meter represents the intermediate charging range.

19. The method of claim 18, further comprising:
generating for presentation, at a third position of the charge level status meter:
- a second peg indicator representing the charging range associated with the range selection, wherein the third position is located further along the charge level status meter than the first position and the second position; and
- an estimated charge time to reach the charging range associated with the range selection; and in response to determining the current vehicle range has reached the intermediate charging range:
- modifying the generating for presentation of the first peg indicator associated with the intermediate charging range; and
- continuing to generate for presentation the second peg indicator and the estimated charge time to reach the range selection charging range.

20. A non-transitory computer-readable medium having non-transitory computer-readable instructions encoded thereon that, when executed by a processor, cause the processor to:
- determine a current vehicle range of the electric vehicle;
- determine a range selection of the electric vehicle based on a user selection;
- determine, based on the current vehicle range and a charging range associated with the range selection, an intermediate charging range between the current vehicle range and the charging range associated with the range selection;
- determine an estimated charge time to charge the electric vehicle to the intermediate charging range; and
- generate for presentation an indication of the intermediate charging range and the estimated charge time to reach the intermediate charging range.

* * * * *